(12) United States Patent
Hughes

(10) Patent No.: US 7,360,909 B1
(45) Date of Patent: Apr. 22, 2008

(54) PHOTOGRAPHIC LIGHT REFLECTOR

(76) Inventor: Jerry Hughes, 5521 Greenville Ave., Ste 104-732, Dallas, TX (US) 75206

( * ) Notice: Subject to any disclaimer, the term of this patent is extended or adjusted under 35 U.S.C. 154(b) by 169 days.

(21) Appl. No.: 11/291,148

(22) Filed: Dec. 1, 2005

(51) Int. Cl.
*G03B 15/02* (2006.01)
*G03B 15/06* (2006.01)

(52) U.S. Cl. .............................. 362/18; 362/16; 362/8; 396/174; 396/200

(58) Field of Classification Search ............ 362/16–18, 362/3, 8, 7; 396/174, 200, 154, 175, 188, 396/198
See application file for complete search history.

(56) References Cited

U.S. PATENT DOCUMENTS

| | | | |
|---|---|---|---|
| D312,471 S | 11/1990 | Couch | |
| 5,154,503 A | * 10/1992 | Sternsher | ..................... 362/16 |
| 5,778,264 A | * 7/1998 | Kean | ......................... 396/174 |
| 5,839,006 A | * 11/1998 | Beckerman | ................. 396/174 |

OTHER PUBLICATIONS

"Photo Tid Bits" www.wrothiak.net/photo/LQ, Jun. 22, 2003.
"Pocket Bouncer (LQ-871 D)" www.lumiquest.com/LQ871.htm, Nov. 29, 2005.
"Flip-It! Adjustable Reflector System" www.joedembphotography.com/flipit, Nov. 29, 2005.

* cited by examiner

*Primary Examiner*—Sandra O'Shea
*Assistant Examiner*—Bao Q. Truong

(57) ABSTRACT

The present invention discloses and teaches a new and improved photographic flash attachment, light reflecting apparatus that is lightweight, flexible, easily attached and/or detached from a camera flash and conveniently stored in a rolled or folded configuration. The disclosed flash reflector is configured from a thin, flexible, planar preform of polyurethane foam material, or any other suitable material, into an adjustable, generally concave configuration whereby adjusting the reflectors shape adjusts the power of the light it reflects to balance with the existing natural light or bounce off a ceiling thereby eliminating and/or reducing shadows about the photographic subject.

12 Claims, 10 Drawing Sheets

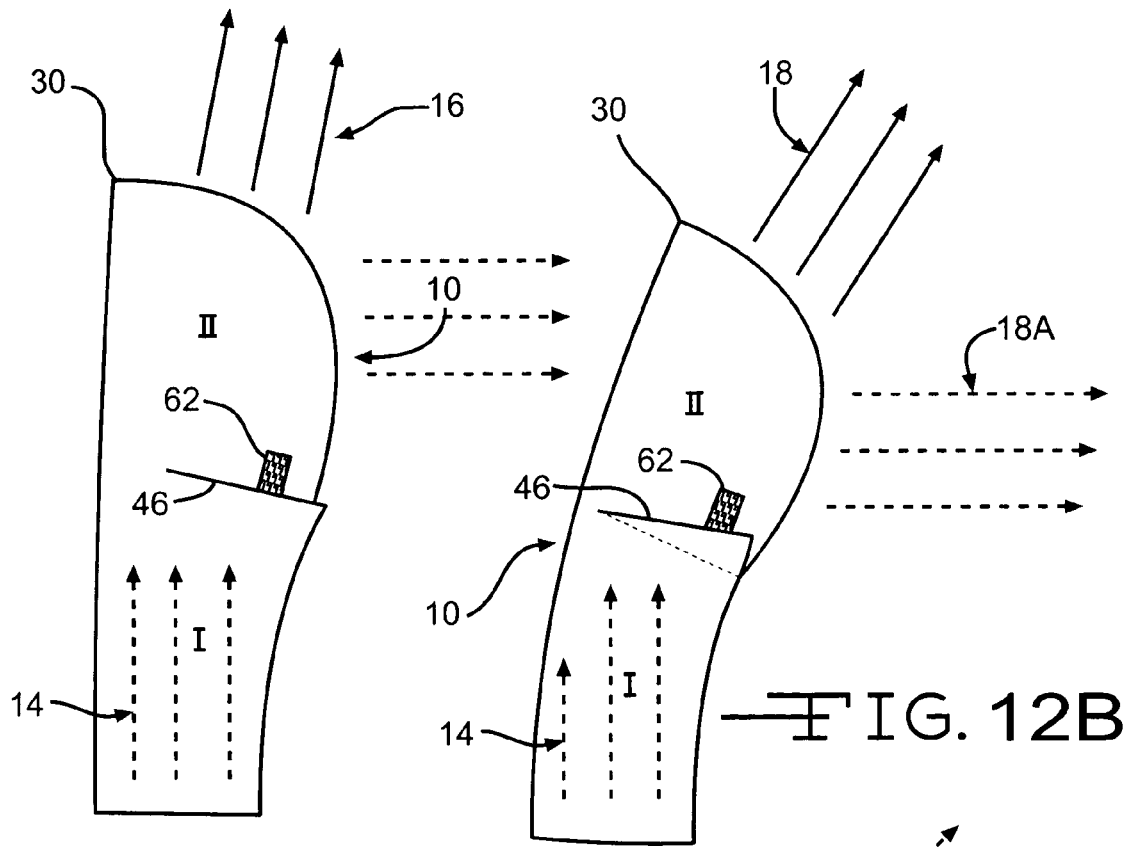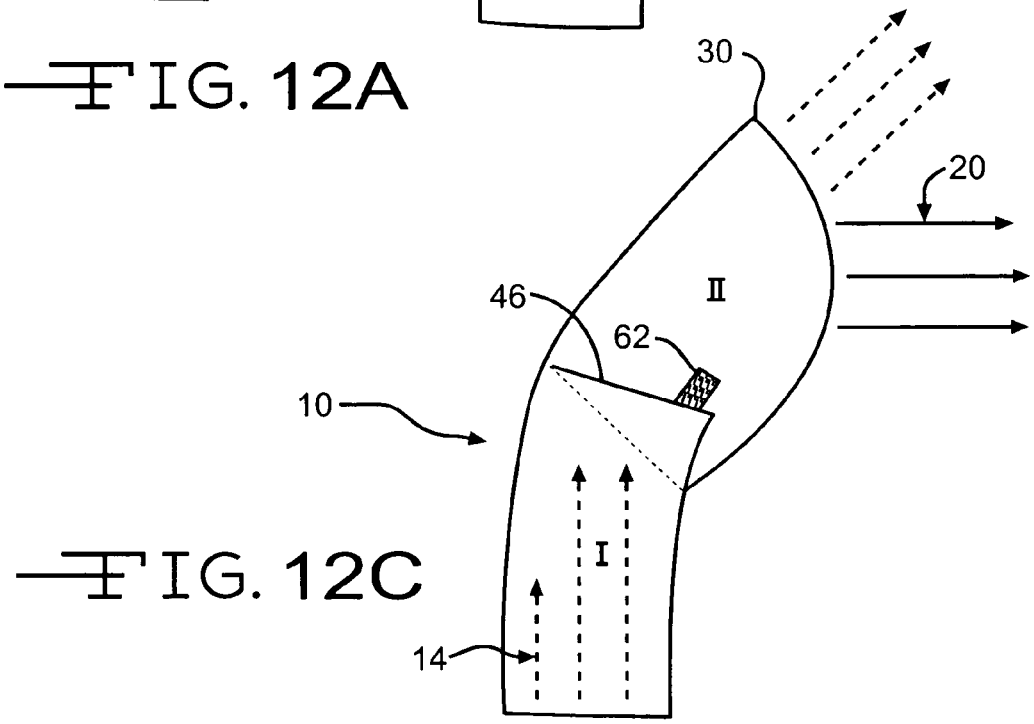
FIG. 12A
FIG. 12B
FIG. 12C

PHOTOGRAPHIC LIGHT REFLECTOR

BACKGROUND

1. Field of the Invention

The present invention generally relates to an artificial light reflector typically used with photographic equipment. More particularly the present invention discloses and teaches an improved light reflector for use with camera flash accessories.

A typical camera flash accessory includes attaching a flash directly to the camera, a flash bracket or a light stand containing the flash, or a hand-held flash held away from the camera. The flash of the flash accessory, produces a harsh light and undesirable shadows. However, reflecting the light with a reflector softens the light but typically reduces the amount of light reaching the subject being photographed. Thus the effective photographic distance between the camera and the subject is reduced to approximately 10 to 15 feet maximum. Photographers therefore need a flash reflector that can be quickly attached to the flash attachment for close up shots, and removed for distance photographs. Further such a flash attachment reflector should be easily stored and/or retrieved between uses.

2. Prior Art

A light reflector for use on a hand held camera flash-attachment is disclosed in U.S. Pat. No. 5,839,006 issued to A. E Beckerman on Nov. 17, 1998 titled, "Apparatus And Method For Directing Light From a Swivel Flash Head." Beckerman teaches a seated light reflector for attachment to the flash apparatus of a hand held camera that is formed from a rigid material, such as molded plastic or pressed metal. As such the Beckerman light reflector is cumbersome, non-adjustable, and lacks convenient portability.

The Beckerman light reflector is commercially marketed under the trademark SHELL™ comprising a rigid plastic material weighing approximately two ounces.

The Beckerman flash attachment reflector does not attach and/or detach quickly nor easily. Beckerman's hard rigid material is not collapsible making it difficult to quickly store and retrieve. Thus the Beckerman reflector is cumbersome and requires a large volumetric area for storage. It is asymmetrical, works on the long side of the flash and cannot be easily printed on because of it rigid round shape. Beckerman's SHELL'S hard rigid material creates its structure but it is not collapsible making it difficult to quickly store and retrieve. The Beckerman reflector attaches to the top of a flash attachment by two, relatively long, VELCRO® strips extending along opposing sides of the length of the flash attachment. Because of the inherent rigidity of the Beckerman reflector, the VELCRO® strips, on the reflector, are difficult to engage and/or disengage from the flash attachment and generally requires two hands for attachment and/or removal and may result in damage to the flash attachment foot and camera hot shoe.

Further the Beckerman reflector has no provisions for adjusting, or controlling, the angle, or power of its reflector's light. Still further, the Beckerman reflector does not accommodate a tilt flash head, and is only useful with a flash attachment, having a swivel head of which there are fewer models.

What is needed is a lightweight, flexible flash reflector that is quick to attach and/or detach, store, retrieve and shape adjustable.

BRIEF SUMMARY OF THE PRESENT INVENTION

The present invention overcomes the shortcomings of the above referenced prior art by teaching a photographic light reflector, suitable for use on a camera's flash accessory, that is very light in weight, flexible, easily adjustable and that may be conveniently rolled or folded for storage in the user's pocket or camera bag. A flash attachment light reflector embodying the herein invention weighs approximately one half of an ounce. Thus a flash attachment embodying the present invention is approximately seventy-five percent lighter in weight than the prior art Beckerman flash attachment light reflector.

A preform of a flash attachment light reflector embodying the present invention is preferably die cut from a thin planar sheet of polyurethane foam material having a thickness within the range of $1/32$ inch to $1/4$ inch and preferably $1/16$ inch. A suitable polyurethane foam sheet is marketed as sheets by RAM Technologies, Inc. of Mukilteo, Wash.

VELCRO® J-hook strips and loop patches are selectively placed upon the preform such that the otherwise flat preform may be shaped into a desired concave configuration thereby forming a quasi parabolic light reflector. Additional VELCRO® J-hook patches are placed about the base of the pseudo parabolic light reflector whereby the configured polyurethane foam reflector may be easily attached to and/or removed from the camera's flash attachment apparatus.

DESCRIPTION OF THE DRAWINGS

FIGS. 12A through 12C illustrate side elevational views of the light reflector, illustrated in FIG. 1, illustrating various configurations of which the light reflector of FIG. 1 may configured.

DETAILED DESCRIPTION OF THE INVENTION

FIGS. 1 through 4 presents a pictorial, top and bottom, and right side elevational view of the preferred embodiment of my new, improved, foldable, light-reflecting reflector 10, particularly useful for use with camera flash accessories.

Flash accessories include flash attachments that may be attached directly to a camera, or to a flash bracket or light stand. Alternatively, the flash accessory can be a stand-alone accessory that is held away from the camera. The camera may be on a tripod or hand held. Types of flashes that are suitable for my invention include a bounce flash that has a head that tilts up and down or a swivel/bounce flash that has a head that tilts up and down as well as swivels left and right.

Figure 5:
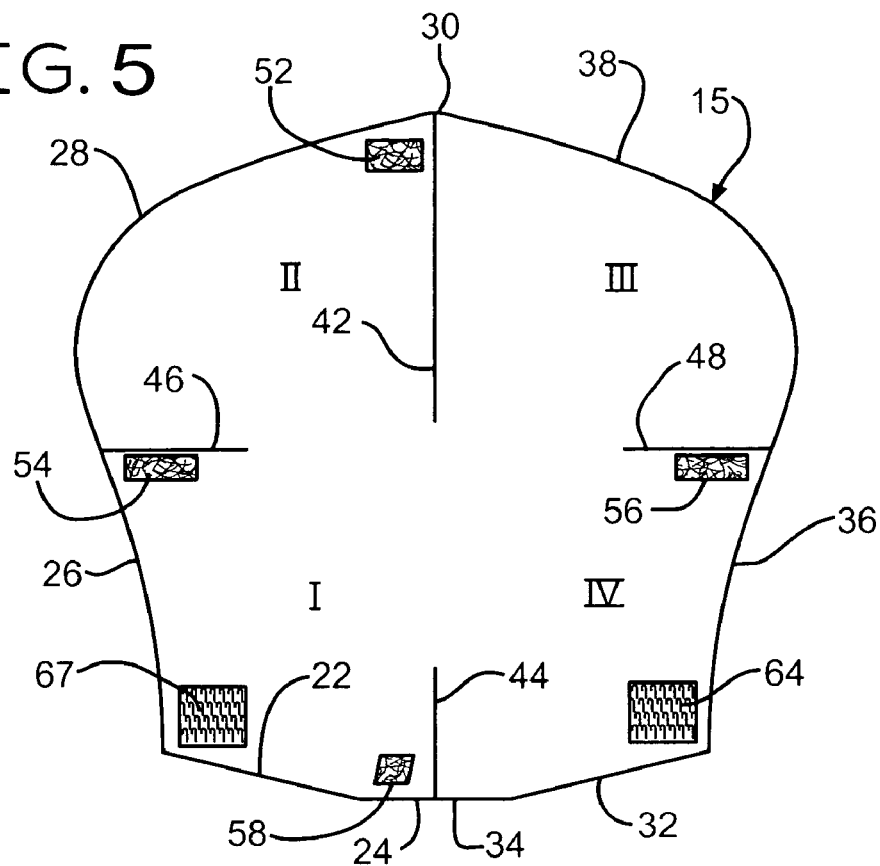
FIG. 5 presents a front side, planar view of the light reflector preform, illustrated in FIG. 1, in its open, flat, configuration prior to being reconfigured into the operational configuration as illustrated in FIG. 1.
Figure 6:
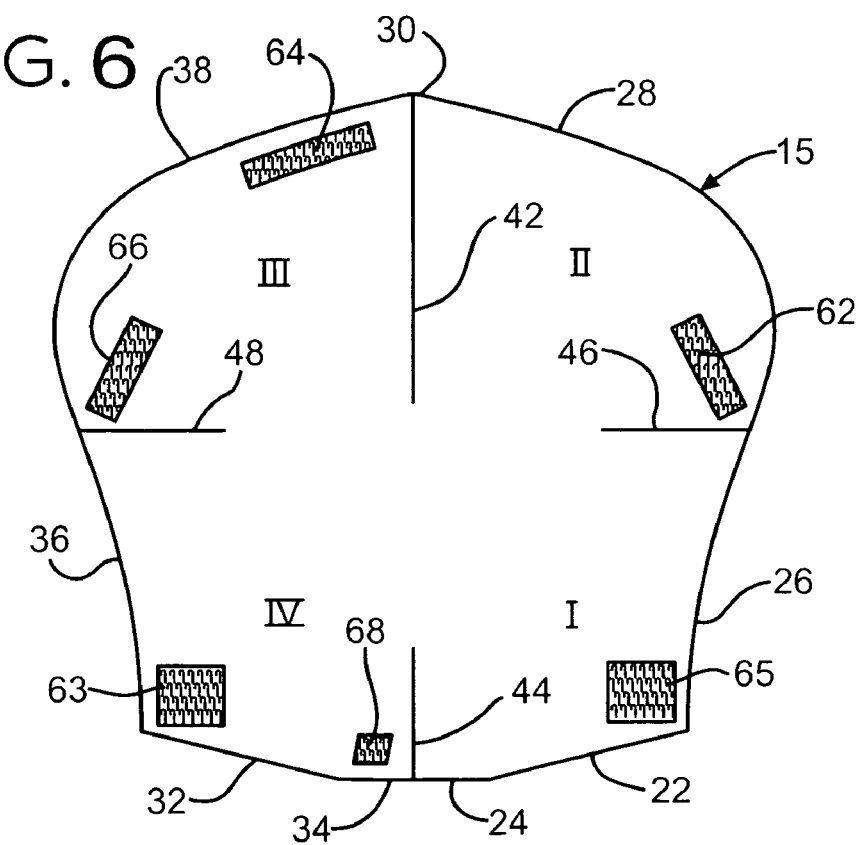
FIG. 6 presents a back side, planar view of the light reflector preform, illustrated in FIG. 1, in its open, flat, configuration prior to being reconfigured into the operational configuration as illustrated in FIG. 1.

Turning now to FIGS. 5 through 6, reflector 10 is formed from a flat, planar preform 15 basically configured as illustrated in FIGS. 5 and 6. Preform 15 is preferably die cut from a flat planar sheet of flexible, polyurethane foam material having a thickness within the range of 1/32 inch to 1/4 inch and preferably 1/16 inch. As illustrated in FIGS. 5 and 6, preform 15 basically comprises four quadrants, I, II, III, and IV.

In general, the reflector 10 can be manufactured by cutting out its rounded shape from a flat piece of the flexible material. The cut material can then be folded and wrapped around the flash accessory. Optionally reflector 10 may be partially heat-shaped to produce a concave shape instead of being folded.

Referring to FIG. 5, the bottom peripheral edge of quadrant I, of preform 15, comprises a slopped edge 22 and 32 combined with a generally horizontal edge 24. The preferred angle "A" is approximately 15 degrees. Extending from the bottom peripheral edge 22 is vertical peripheral edge 26, generally comprising an outwardly turning concave curve extending upward from slopped bottom edge 22 as illustrated in FIG. 5 whereby edge 26 joins outer peripheral edge 28 of quadrant II.

Outer peripheral edge 28, of quadrant II, forms a inwardly sweeping, convex curve, as illustrated in FIG. 5, whereupon peripheral edge 28 joins peripheral edge 38 of quadrant III in a cusp 30 as illustrated in FIG. 5. The outer peripheral edges 38, 36, 32, and 34 are mirror images of peripheral edges 28, 26, 22 and 24 respectively. Thus preform 15 is symmetrical about its vertical centerline.

Two cut lines, or slits, are placed upon the vertical centerline of preform 15. Die cut 42, at the top of preform 15, and die cut 44 at the bottom of preform as illustrated in FIGS. 5 and 6. Additionally two horizontal cut lines 46 and 48 are positioned upon preform 15 as illustrated in FIGS. 5 and 6. Cut lines 42, 44, 46, and 48 extend completely through the material of preform 15.

Referring to FIG. 5, illustrating the front planar surface of preform 15, patches of VELCRO® loop material 52 and 54, 56, and 58 are affixed to the front surface of preform 15, in quadrants I, II and IV, as illustrated in FIG. 5. VELCRO® loop patch 52 is positioned to the left of and immediately adjacent to die cut 42. VELCRO® loop patch 54 is positioned below and immediately adjacent die cut 40. VELCRO® loop patch 56 is positioned below and immediately adjacent to die cut 46. VELCRO® loop patch 58 is positioned left of and immediately adjacent die cut 44.

Further patches of VELCRO® J hooks 67 and 64 are affixed to quadrants I and IV, of the front surface of preform 15 as illustrated in FIG. 5. VELCRO® J hook patch 67 is positioned in the lower left corner of quadrant I and VELCRO® J hook patch 64 is positioned in the lower right corner of quadrant IV as illustrated in FIG. 5. Optionally, in one of my preferred embodiments, I use only two VELCRO® tabs on the short sides of the flash. The light comes from the broad side of the flash and is distributed evenly into the reflector.

Referring now to FIG. 6, illustrating the back or reverse surface of preform 15, quadrant II has an elongated VELCRO® loop strip 62, preferably at an angle to the lower right peripheral edge of quadrant II and adjacent to die cut 46 as illustrated in FIG. 6. Within quadrant III two angled VELCRO® loop strips 64 and 66 are affixed the outer peripheral edge of quadrant III; VELCRO® loop strip 66 being placed adjacent die cut 48 and VELCRO® loop strip 64 juxtaposed die cut 42 as illustrated in FIG. 6. A small VELCRO® loop patch 68, similar in size to VELCRO® J hook patch 58, is affixed within quadrant IV, as illustrated, adjacent to cut 44.

Figure 2:
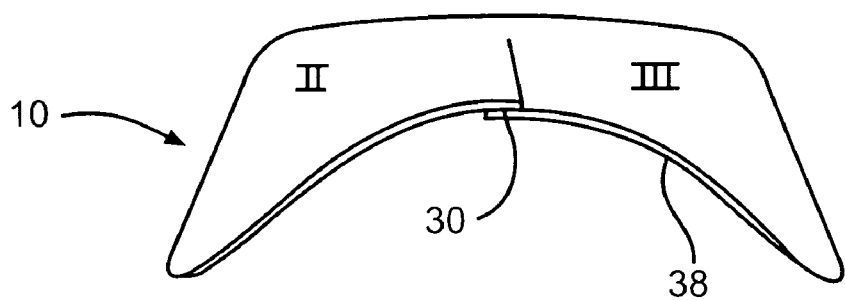
FIG. 2 presents a top plan view of the light reflector illustrated in FIG. 1.
Figure 1:
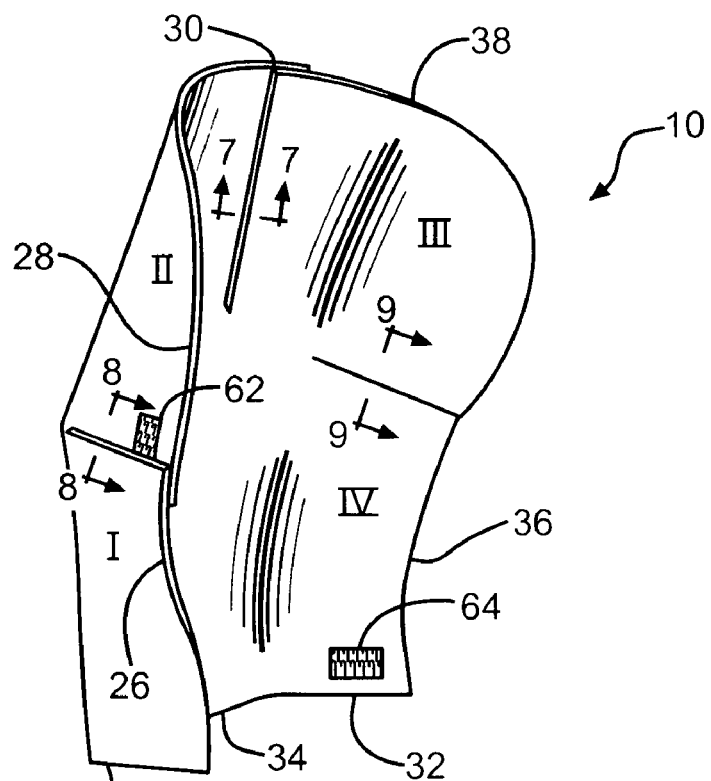
FIG. 1 presents a pictorial view of my new improved light reflector in its operational configuration.
Figure 3:
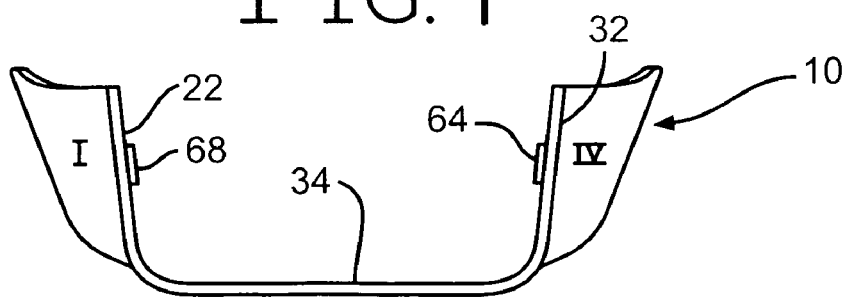
FIG. 3 presents a bottom view of the light reflector illustrated in FIG. 1.
Figure 4:
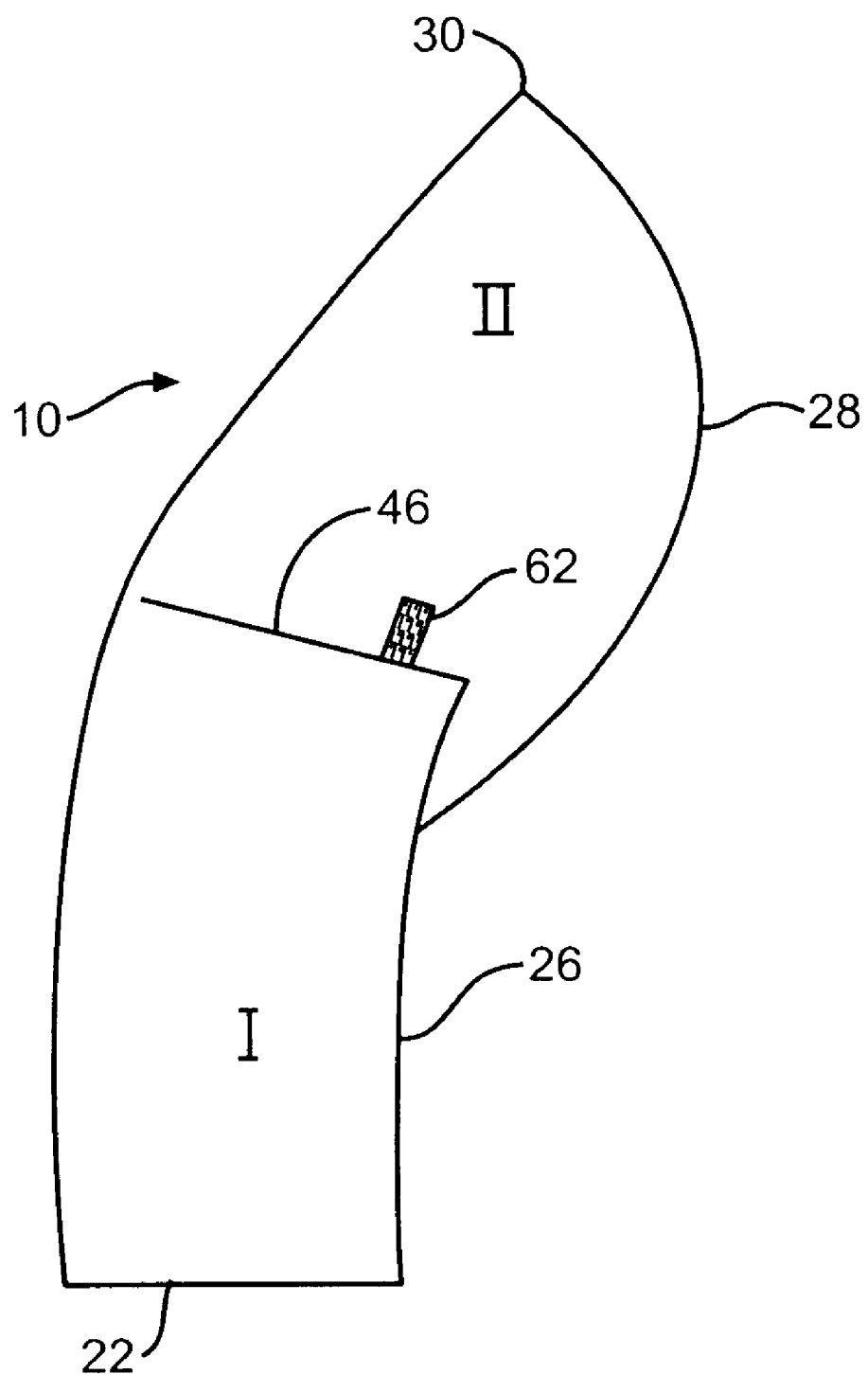
FIG. 4 presents a right side elevational view of the light reflector illustrated in FIG. 1.
Figure 7:
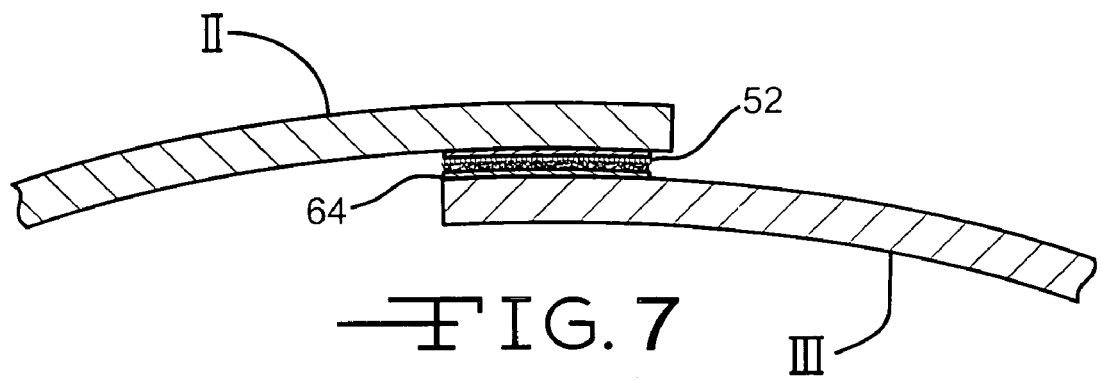
FIG. 7 presents a crossectional view taken along line 7-7 in FIG. 1.
Figures 8, 9:
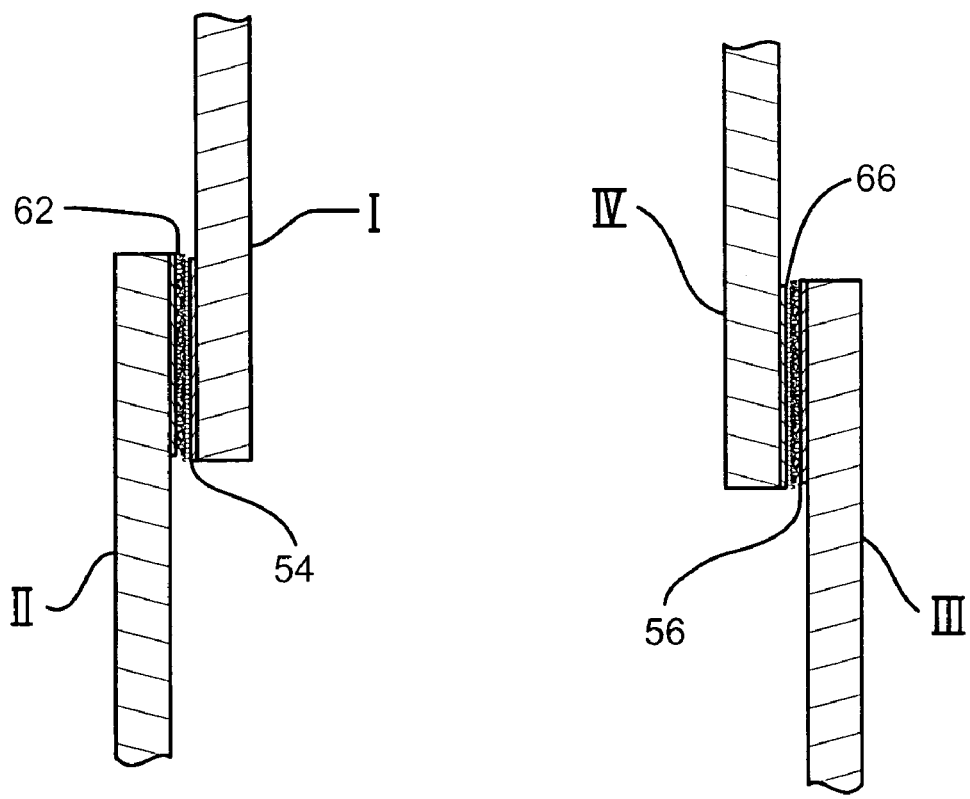
FIG. 8 presents a crossectional taken along line 8-8 in FIG. 1.
FIG. 9 presents a crossectional view taken along line 9-9 in FIG. 1.

Preform 15 is formed into the concave, light reflector configuration 10, as illustrated in FIG. 1, by slightly overlapping quadrant III over quadrant II, at cut line 42, whereby VELCRO® J hook strip 64 engages VELCRO® loop patch 52 thereby attaching quadrant III to quadrant II as illustrated in FIG. 7, and forming a first shallow bowl like configuration. Next quadrant IV, at cut line 48, is overlapped by quadrant III, see FIG. 9, whereby VELCRO® J hook strip 66 engages VELCRO® loop patch 56 and quadrant II, at cut line 46, is overlapped by quadrant I, see FIG. 8, whereby VELCRO® J hook strip 62 overlaps VELCRO® loop patch 54 thereby forming a deeper bowl like configuration. The bottom of the reflector is closed off by overlapping VELCRO® J hook patch 68, adjacent cut line 44, upon VELCRO® loop patch 58. Alternatively VELCRO® J hook patch 68 and loop patch 58 may be replaced by a permanent adhesive attachment.

The concavity of photographic flash reflector 10 may be conveniently varied by adjusting the amount of overlap of quadrants II and III. Further the vertical angle of light reflection may be conveniently varied by adjusting the overlap of quadrants II and III over quadrants I and IV respectively as illustrated in FIGS. 12A through 12C.

FIG. 12A illustrates reflector 10 configured such that all of the light 16, emanating from the light source 14, is directed vertically. FIG. 12B illustrates reflector 10 configured such that the greater portion of light 18, emanating from light source 14, is angularly directed upward with a lesser amount 18A directed horizontally. FIG. 12C illustrates reflector 10 configured such that all of the light from light source 14 is directed horizontally.

Figure 10A:
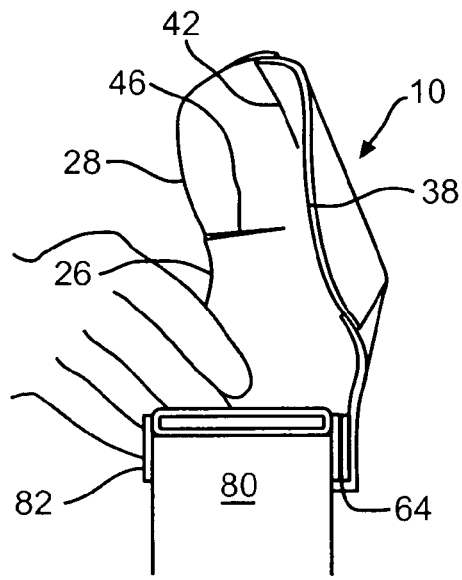
FIGS. 10A through 10C presents a pictorial sequence illustrating a configured light reflector, embodying the present invention, being attached to a photographic flash assembly.
Figure 10B:
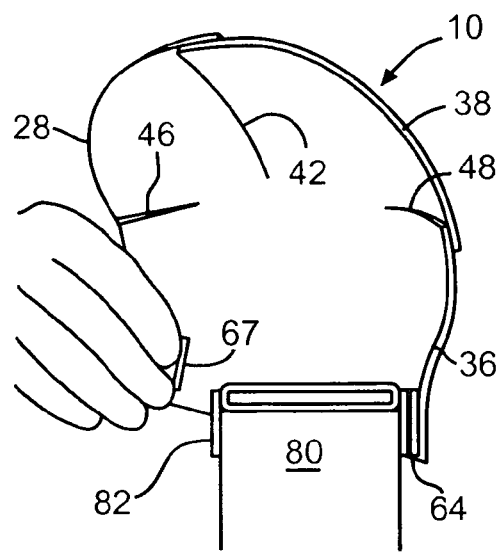
Figure 10C:
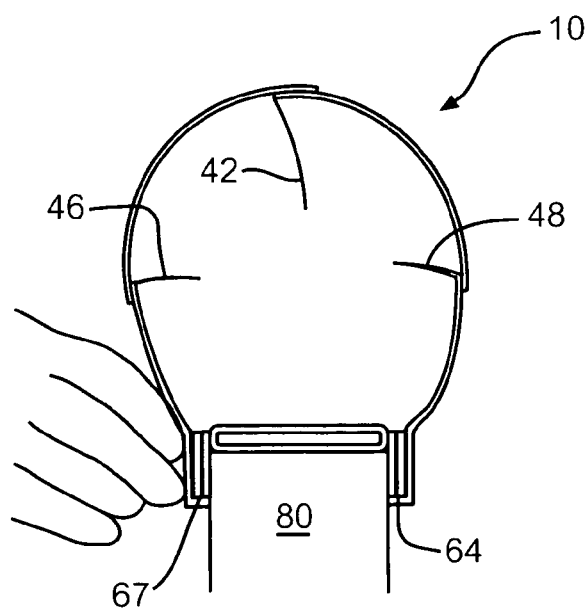
Figure 11:
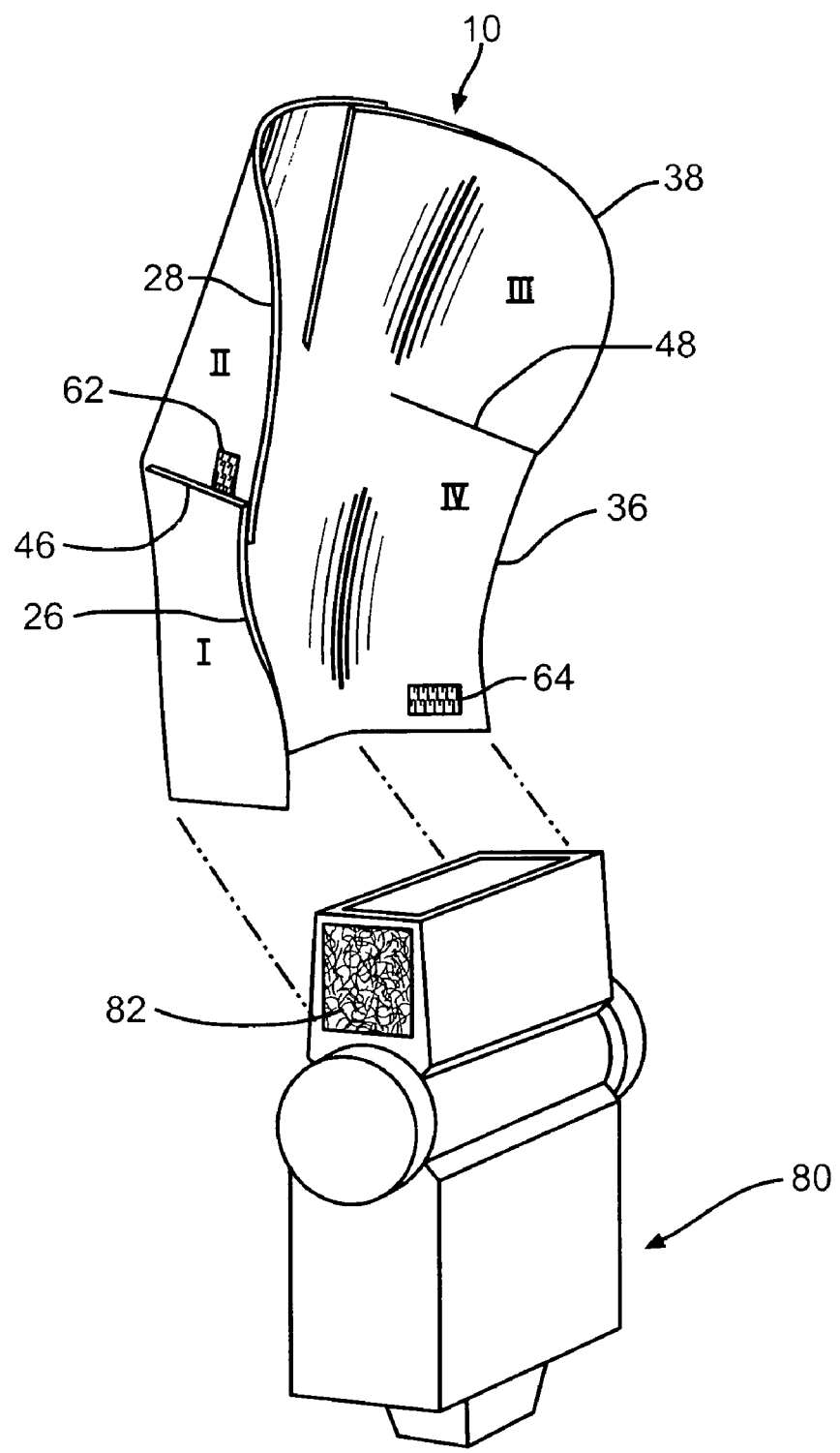
FIGS. 11 and 11A presents a pictorial view of a light reflector, embodying the present invention, as it is attached to a photographic flash attachment.
Figure 11A:
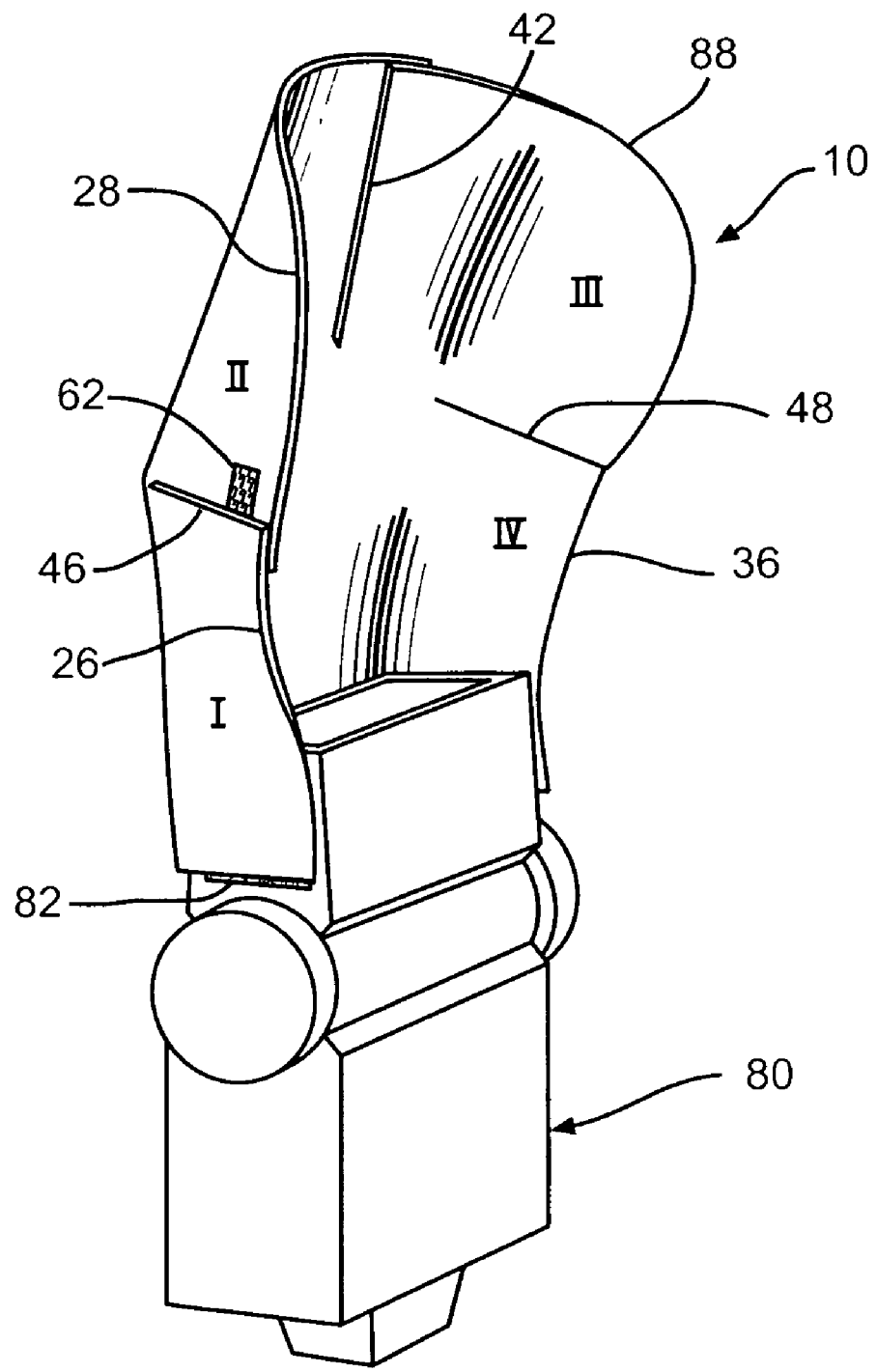

FIGS. 10A through 10C progressively illustrate the ease by which photographic flash reflector 10 may be attached to a typical photographic flash attachment. As illustrated, VELCRO® J hook patch, 64 is attached to a first VELCRO® loop patch on one side of the flash attachment 80 as shown in FIG. 10A. The base of reflector 10 is then wrapped around flash attachment 80, FIG. 10B, and VELCRO® J hook patch 67 is then attached to the VELCRO® loop patch on the opposite side of flash attachment 80 as shown in FIG. 10C thereby simply attaching flash reflector 10 to flash attachment 80. Reflector 10 may be easily removed by reversing the process. FIGS. 11 and 11A further illustrate attachment of reflector 10 to flash attachment 80.

Figure 13:
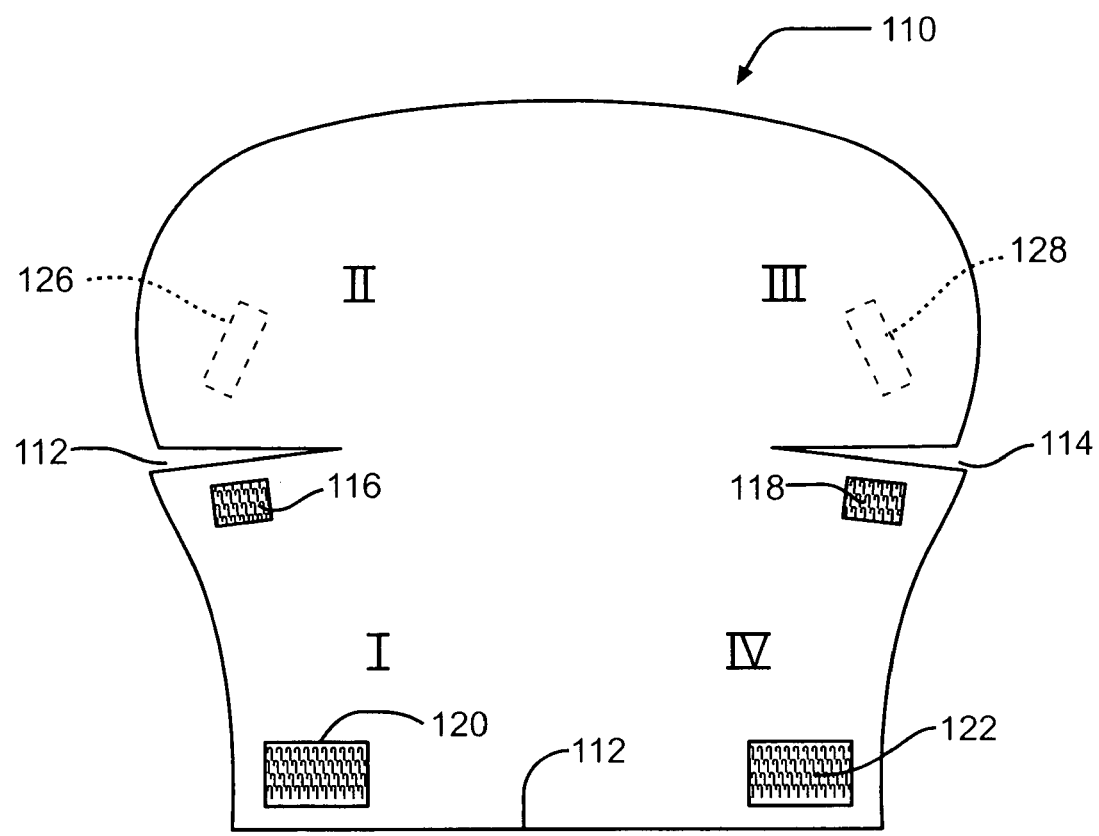
FIG. 13 presents a front side, planar view of a first alternate embodiment preform of my improved photographic light reflector prior to being reconfigured into its operational configuration.

FIG. 13 presents a front, planar view of preform 110 as a first alternate embodiment of my improved photographic light reflector. Quadrant II and II, of preform 110, basically comprises an upper peripheral shape similar to that of preform 15 except that cusp 30 and cut-lines 42 and 44 are absent. Further base line 112 is horizontally straight and narrow V-groove slots 112 and 114 are cut into the opposing peripheral sides. VELCRO® J hook patches 116 and 118 are positioned below and adjacent slots 112 and 114, as illustrated in FIG. 13, with opposing VELCRO® loop strips 126 and 128 located on the reverse surface of preform 110, as illustrated in FIG. 13, whereby slots 112 and 114 may be overlappingly fastened to one another as taught above, thereby forming a concave light reflecting structure. Similarly VELCRO® J-hook patches 120 and 122 are provided at the base 112 of preform 110, as illustrated in FIG. 13, for attachment of the resulting, concave, photographic light reflector to an acceptable photographic flash attachment as illustrated in FIGS. 10 through 11.

Figure 14:
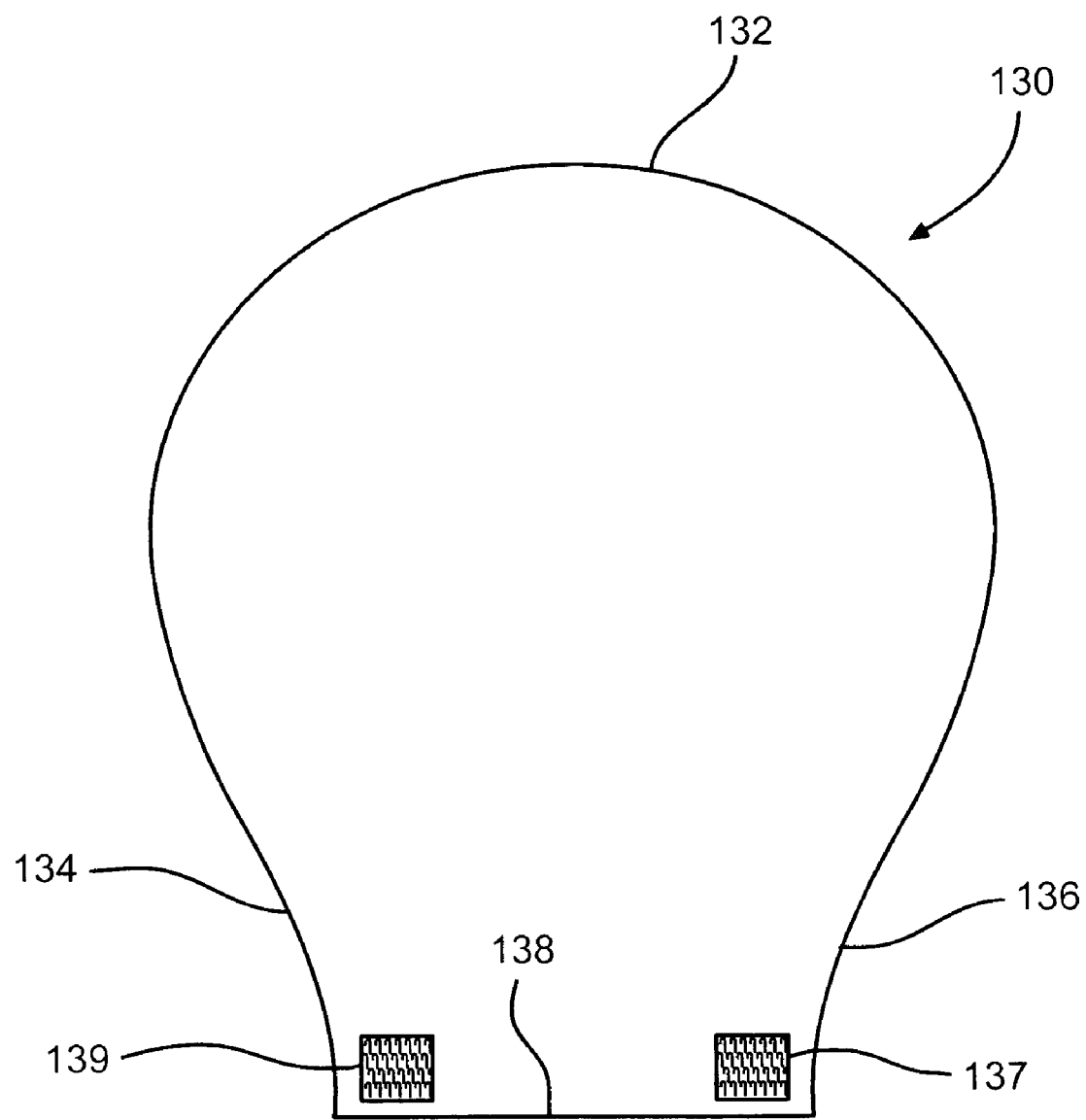
FIG. 14 presents a front side, planar view of a second alternate embodiment preform of my improved photographic light reflector prior to being reconfigured into its operational configuration.

FIG. 14 presents a front, planar view of preform 130 as a second alternate embodiment of my improved photographic light reflector. Preform 130 basically comprises a circular peripheral shape 132 joining horizontal base line 138 through concave curved side edges 134 and 136, as illustrated in FIG. 14. VELCRO® J-hook patches 137 and 139 are provided at the base 138 of preform 130, as illustrated in FIG. 14, for attachment of the photographic light reflector to an acceptable photographic flash attachment as illustrated in FIGS. 10 through 11. Preform 130 will assume a fixed concave configuration when VELCRO® J-hook patches 137 and 139 are attached to the VELCRO® J-loop patches 82 on photographic flash attachment 80. The concave shape of preform 130, when attached to a camera flash attachment 80, may be controlled by the peripheral shape 132 of the preform.

Because of the flexible material from which the preforms are manufactured and their flat planar configuration when not applied to the flash attachment of a camera, the preforms may be conveniently rolled up or folded in half and in half again and placed in the users pocket or camera bag. It recovers its shape after folding.

It has been found that a decorative fabric may be adhesively applied the back surface of the thin polyurethane foam sheet prior to die cutting the reflector preforms. Thus a mat-black fabric may be applied to the reverse side of the preforms upon which a brand name, trademark and/or logo may be conveniently applied. Preferably the foam is printed while it is flat, before it is folded or shaped. Another option is to provide a colored fabric material to the back side of the polyurethane foam material such as gold whereby the preform may be configured to function as a white or gold light reflector when reversed.

Although the preferred embodiment, as described above, teaches fabricating the photographic light reflector preforms from a thin polyurethane foam material, any thin, pliable material may be used. And it can be made reversible so that two separate reflecting surfaces can be utilized on one reflector.

My invention provides many advantages, some of which include: (a) reducing the adhering area so that there is less resistance and stress on the flash foot and camera hot shoe, and allowing a photographer to quickly attach it for close shots, and then to quickly remove it for distance photos; (b) its wrap-around design allows the photographer to attach and detach it using only one hand; (c) its flexible material creates both the reflector's shape and structure when wrapped around the flash head without needing a supporting framework, allowing it to collapse for ease of storage and retrieval; (d) the reflector is adjustable, allowing a photographer to optimize light and power to bounce, balance with existing light or match a particular photo setting; and (e) its unique light-weight, low profile design minimizes the reflector's cost of manufacture and shipping by using less material and reducing the amount of necessary machine tooling and dies.

It is evident that many alternatives, modifications, and variations of the present invention will be apparent to those skilled in the art in light of the foregoing teachings. Accordingly, the invention is intended to embrace all such alternatives, modifications, and variations as may fall within the spirit and scope of the appended claims.

I claim:

1. A preform for assembly of a photographic light reflector suitable for attaching to the flash accessory of a photographic camera, said preform comprising:
   a) a planar sheet of thin flexible material (130) having a bottom perimeter edge (138),
   b) a top portion having a circular perimeter edge (132), said top portion perimeter edge (132) joining said bottom perimeter edge (138) by opposing concave perimeter edges (134, 136),
   c) at least two spaced apart J-hook patches (139, 137) adjacent said bottom perimeter edge (138), whereby said preform (130) may be folded around a symmetrical axis thereby forming a concave light reflector attachable to said photographic flash attachment by said J-hook patches (139, 137),
   d) preferably die cut from a thin planar sheet of polyurethane foam material having a thickness within a range of 1/32 inch to 1/4 inch,
   e) the flexible material creates both the reflector's shape and structure when wrapped around a flash head without needing a supporting framework.

2. The preform as claimed in claim 1 wherein the thickness of said polyurethane foam material is preferably 1/16 inch.

3. A preform for assembly of a photographic light reflector suitable for attaching to the flash accessory of a photographic camera, said preform comprising:
   a) a planar sheet of thin formable material (110) having a bottom perimeter edge (112), said planar sheet having a first planar surface and second reverse planar surface,
   b) a top portion having a curvilinear perimeter edge said top portion perimeter edge joining said bottom perimeter edge (112) by opposing concave perimeter edges,
   c) said preform (110) having opposing "V" shaped slots (112, 114) within said curvilinear perimeter edge,
   d) a first J-hook patch (116) affixed to said first planar surface adjacent said "V" shaped slot (112),
   e) a second J-hook patch affixed to said first planar surface adjacent said "V" shaped slot (114),
   f) a first loop patch (126) affixed to said second planar surface adjacent said "V" shaped slot (112) such that said first loop patch (126) may overlap, and attach to, said first J-hook patch (116),
   g) a second loop patch (128) affixed to said second planar surface adjacent said "V" slot (114) such that said second loop patch (128) may overlap, and attach to, said second J-hook patch (118),
   h) at least two spaced apart J-hook patches (120, 122) adjacent said bottom perimeter edge (112) of said first planar surface, whereby said preform (110) may be configured about its symmetrical axis thereby forming a concave light reflector attachable to said photographic flash attachment by said J-hook patches (120, 122).

4. The preform as claimed in claim 3 wherein said preform comprises a thin planar sheet of polyurethane foam material.

5. The preform as claimed in claim 4 wherein the thickness of said thin planar sheet of polyurethane foam material lies within the range of 1/32 inch to 1/4 inch.

6. The preform as claimed in claim 5 wherein the thickness of said polyurethane foam material is preferably 1/16 inch.

7. A preform for assembly of a photographic light reflector suitable for attaching to the flash accessory of a photographic camera, said perform being adjustable, flexible, and collapsible, comprising:

a) a planar sheet of thin formable material (15) having a bottom perimeter edge (22,24,34,32), said planar sheet having a first light reflecting planar surface and second reverse planar surface, said preform having a first quadrant (I), a second quadrant (II), a third quadrant (III) and a fourth quadrant (IV), b) said first quadrant (I) and said fourth quadrant (IV) having concave perimeter edges (30, 26), said concave perimeter edges joining said bottom perimeter edges (22, 32), c) said second quadrant (II) and third quadrant (III) having a curvilinear perimeter edge (28, 38), said curvilinear edges (28, 38) joining to form a cusp (30), d) a first cut line (42) extending from said cusp (30) along the symmetrical axis of said preform (15) thereby separating quadrant (II) from quadrant (III), e) a second cut line (46) extending from said perimeter edge (28) thereby partially separating quadrant (I) from quadrant (II), e) a third cut line (48) extending from said perimeter edge (38) thereby partially separating said third quadrant (III) from said fourth quadrant (IV), f) a fourth cut line (44) extending from said bottom perimeter edge (24, 34) thereby partially separating quadrant (I) from quadrant (II), g) a first J-hook patch (54) affixed to said first quadrant's (I) first light reflecting surface adjacent to said second cut line (46), h) a second J-hook patch (52) affixed to said second quadrant's (II) first light reflecting surface adjacent to said first cut line (42), i) a third J-hook patch (56) affixed to said fourth quadrant's (IV) first light reflecting surface adjacent to said third cut line (48), j) a fourth J-hook patch (58) affixed to said first quadrant's (I) first light reflecting surface and adjacent to said fourth cut line (44), k) a first loop patch (62) affixed to said second quadrant's (II) reverse planar surface and adjacent said first cut line (46), such that said first J hook patch (54) may overlap and attach to said first loop patch 62, l) a second loop patch (64) affixed to said third quadrant's (III) reverse planar surface and adjacent said second cut line (42), such that said second J hook patch (52) may overlap and attach to said second loop patch (64), m) a second loop patch (64) affixed to said third quadrant's (III) reverse planar surface and adjacent said second cut line (42), such that said second J hook patch (52) may overlap and attach to said second loop patch (64), n) a fourth loop patch (68) affixed to said fourth quadrant's (IV) reverse planar surface and adjacent said fourth cut line (44), such that said fourth J hook patch (58) may overlap and attach to said fourth loop patch (68), o) at least two spaced apart J-hook patches (62, 64) affixed to said first light reflecting surface and adjacent said bottom perimeter edge (22,24,34,32)), whereby said preform (15) may be folded about its symmetrical axis thereby forming a concave light reflector attachable to said photographic flash attachment by said J-hook patches (62, 64).

8. The preform as claimed in claim 7 including at least two spaced apart J-hook patches (63 and 65) affixed to said second reverse surface and adjacent said bottom perimeter edge (22,24,34,32), whereby said preform (15) may be reverse folded folded about its symmetrical axis thereby forming a reverse concave light reflector attachable to said photographic flash attachment by said J-hook patches (63, 65)).

9. The preform as claimed in claim 7 wherein said patches (58) and (68) are replaced by an adhesive whereby the overlapped portion of quadrants (I) and (IV) are permanently affixed one to the other.

10. The preform as claimed in claim 7 wherein said preform comprises a thin planar sheet of polyurethane foam material.

11. The preform as claimed in claim 10 wherein the thickness of said thin planar sheet of polyurethane foam material lies within the range of 1/32 inch to 1/4 inch.

12. The preform as claimed in claim 11 wherein the thickness of said polyurethane foam material is preferably 1/16 inch.

* * * * *